Nov. 3, 1936.  F. G. NESBITT  2,059,266
GYRO HORIZON INDICATOR
Filed Sept. 20, 1933
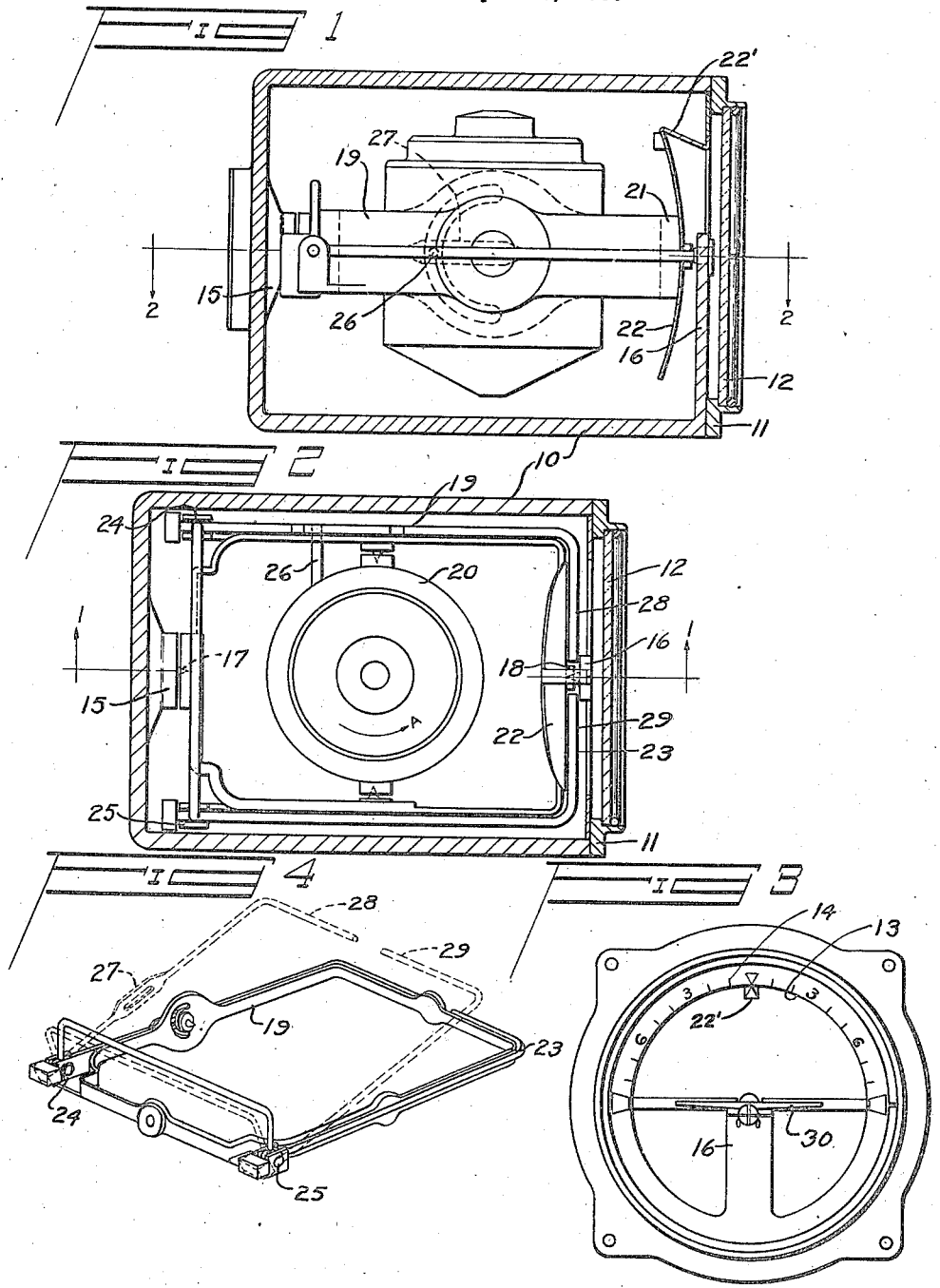
INVENTOR
FRANCIS GLEN NESBITT Patented Nov. 3, 1936

2,059,266

UNITED STATES PATENT OFFICE 2,059,266

GYRO HORIZON INDICATOR

Francis Glen Nesbitt, Dayton, Ohio

Application September 20, 1933, Serial No. 690,228

4 Claims. (Cl. 33—204)

(Granted under the act of March 3, 1883, as amended April 30, 1928; 370 O. G. 757)

The invention described herein may be manufactured and used by or for the Government for governmental purposes without the payment to me of any royalty thereon.

The present invention relates generally to aircraft and more particularly to instruments for indicating various attitudes of an aircraft while in flight.

The primary object of the present invention is to provide a gyroscopically controlled attitude indicating instrument characterized by the gyroscope being so mounted such that a greater angular range of operation is afforded than is now obtained in instruments of the type now in use.

The invention may also be said to comprise various details and peculiarities in the construction, arrangement and combination of the various parts, substantially as will be hereinafter described and then more particularly pointed out in the appended claims.

In the drawing:

Fig. 1 is a vertical sectional view taken on the line 1—1 of Fig. 2.

Fig. 2 is a sectional view taken on the line 2—2 of Fig. 1.

Fig. 3 is a front elevation of the instrument.

Fig. 4 is a detail perspective view illustrating the construction of the horizon bar.

Referring more particularly to the drawing wherein corresponding parts are designated by like numerals throughout the several views thereof, the instrument in one embodiment of my invention herein illustrated comprises generally an instrument casing 10 which is provided at its forward end with a cover plate 11 and glass bezel 12, a scale 13 being mounted rearwardly of the bezel 12 bearing graduations 14 for indicating in degrees, banking attitudes of an aircraft.

As shown in Fig. 1, the casing 10 is formed with a rear support 15 and a front supporting arm 16, each being provided with conical bearings 17 and 18 respectively within which is mounted a rectangular shaped gimbal ring 19. As shown in Fig. 1, the axis of rotation of this gimbal ring is parallel to the longitudinal axis of the casing 10 and when mounted on the axis should be parallel to the longitudinal axis of the aircraft.

A vertical gyroscope is pivotally mounted in the gimbal ring 19. This "gyro" comprises a case 20 the axis of rotation of which is disposed normally parallel to the lateral axis of the aircraft in which the instrument is used. The gyro is adapted to be driven by air blast in the direction of the arrow "A" in the usual manner. Further details of construction of the gyro will not be described because no invention in the same is claimed.

The forward end 21 of the gimbal ring has mounted thereon a plate 22 forming a mask with which cooperates a horizon bar 23. This plate is provided with a pointer 22' which cooperates with the scale 13 to indicate degrees of banking attitudes of the aircraft. This horizon bar, as shown in Fig. 4, is pivotally mounted as at 24 and 25 to the rear end of the gimbal ring 19. The horizon bar 23 is actuated by a pin 26 protruding from the gyro case 20, which engages in a slot 27 formed in the one side of the horizon bar, as shown in Fig. 4. An indication from the gyro is picked up and brought around to the face of the instrument by the forward end portions 28 and 29 of the horizon bar which terminates on opposite sides of the front supporting arm 16 heretofore mentioned. An aircraft representation 30 is shown mounted on the supporting arm 16 as shown in Fig. 3.

From the foregoing description it will be apparent that when mounted on an aircraft the gimbal ring 19 of the gyroscope will be free to rotate about its axis of rotation unrestrictedly during rolling maneuvers of the aircraft without causing the gyro to upset, thus eliminating any error in indication by reason of the gimbal ring touching the slots employed in instruments of conventional design.

By reason of the bearing arrangement set forth hereinabove, the gyro is permitted to operate throughout 360 degrees of rotation about the axis of rotation of the gimbal ring without contacting any limiting member.

While the above description constitutes a preferred form, it is to be understood that other forms might be adopted, all coming within the scope of the claims which follow.

What is claimed is:

1. In an artificial horizon for aircraft, a rotor bearing frame, a gimbal ring supporting said frame for oscillation about a horizontal axis extending transversely of the aircraft, an outer casing in which said gimbal ring is pivoted about a fore and aft horizontal axis adjacent the front and back of said casing, a horizon bar pivotally mounted on said gimbal ring, and means connecting said frame and bar to rock the bar up and down on pitching of the craft, said bar having the forward portion extending at right angles thereto and lying behind said forward pivot, but having no portion thereof the path of movement of which intercepts the forward gimbal ring pivot in said casing during barrel rolling.

2. In an instrument of the class described, a gyroscope, a gimbal ring supporting said gyroscope on a transverse axis, forward and rear bearings mounting said ring for movement through 360° about a fore and aft axis, a mask on said ring adjacent said forward bearing, and a horizon simulating element transversely pivoted on said ring and controlled by said gyroscope as to its up and down movement, said element having a portion interposed between said mask and said forward bearing so as to clear said bearing in its up and down movements.

3. In an instrument of the class described, a casing, a gyroscope in said casing, a gimbal ring supporting said gyroscope on a transverse axis, forward and rear supports in said casing, each including a bearing portion mounting said ring for movement through 360° about a fore and aft axis, a mask on said gimbal ring adjacent said forward bearing support, and a horizon simulating element transversely pivoted on said ring and controlled by said gyroscope as to its up and down movement, said element comprising side portions and a forward portion in continuation of each side portion, said forward portions being arranged in opposing relation and interposed between said mask and said forward bearing support so as to clear said forward support in their up and down movements.

4. In an instrument of the class described, a casing, a gyroscope in said casing, a gimbal ring supporting said gyroscope on a transverse axis, forward and rear supports in said casing, each including a bearing portion mounting said ring for movement through 360° about a fore and aft axis, a mask on said gimbal ring adjacent said forward bearing support, and a horizon simulating element transversely pivoted on said ring and controlled by said gyroscope as to its up and down movement, said element comprising parallel side portions and a forward portion in continuation of each side portion, said forward portions extending at right angles to said side portions and interposed between said mask and said forward bearing support so as to clear said forward support in their up and down movements.

FRANCIS GLEN NESBITT.